(12) United States Patent
Mottaez et al.

(10) Patent No.: US 9,064,073 B2
(45) Date of Patent: Jun. 23, 2015

(54) HYPER-CONCURRENT OPTIMIZATION OVER MULTI-CORNER MULTI-MODE SCENARIOS

(75) Inventors: Amir H. Mottaez, Los Altos, CA (US); Mahesh A. Iyer, Fremont, CA (US)

(73) Assignee: SYNOPSYS, INC., Mountain View, CA (US)

(*) Notice: Subject to any disclaimer, the term of this patent is extended or adjusted under 35 U.S.C. 154(b) by 311 days.

(21) Appl. No.: 12/845,545

(22) Filed: Jul. 28, 2010

(65) Prior Publication Data

US 2012/0030642 A1 Feb. 2, 2012

(51) Int. Cl.
*G06F 17/50* (2006.01)

(52) U.S. Cl.
CPC .......... *G06F 17/5045* (2013.01); *G06F 17/505* (2013.01); *G06F 2217/84* (2013.01); *G06F 2217/08* (2013.01)

(58) Field of Classification Search
None
See application file for complete search history.

(56) References Cited

U.S. PATENT DOCUMENTS

| | | | |
|---|---|---|---|
| 5,650,938 A | 7/1997 | Bootehsaz et al. | |
| 7,092,838 B1* | 8/2006 | Srinivas et al. | 702/117 |
| 7,739,098 B2* | 6/2010 | Kucukcakar et al. | 703/19 |
| 2009/0199143 A1* | 8/2009 | Schlotman et al. | 716/6 |
| 2009/0222775 A1 | 9/2009 | Idgunji et al. | |
| 2010/0153897 A1* | 6/2010 | Zahn | 716/9 |
| 2011/0289464 A1* | 11/2011 | Iyer et al. | 716/108 |
| 2011/0302546 A1* | 12/2011 | Mottaez et al. | 716/132 |
| 2011/0302547 A1* | 12/2011 | Mottaez | 716/132 |

OTHER PUBLICATIONS

Nian et al, A Unified Multi-Corner Multi-Mode Static Timing Analysis Engine, 15th Asia and South Pacific Design Automation Conference, pp. 669-674, Jan. 2010.*

Shen et al., Useful Clock Skew Optimization Under a Multi-Corner Multi-Mode Design Framework, 11th International Symposium on Quality Electronic Design, pp. 62-68, Mar. 2010.*

Hashimoto, Masanori et al. "A Performance Optimization Method by Gate Sizing using Statistical Timing Analysis", Copyright 2000 ACM 1-58 113-191-7/00/0004. ISPD 2000, San Diego CA.

* cited by examiner

*Primary Examiner* — A. M. Thompson
(74) *Attorney, Agent, or Firm* — Park, Vaughan, Fleming & Dowler LLP; Laxman Sahasrabuddhe (57) ABSTRACT

Some embodiments of the present invention provide techniques and systems for performing aggressive and dynamic scenario reduction during different phases of optimization. Specifically, essential scenarios at gates and timing endpoints can be identified and then used during the dynamic scenario reduction process. In some embodiments, margin values associated with various constraints can be used to determine the set of essential scenarios to account for constrained objects that are near critical in addition to the constrained objects that are the worst violators. In some embodiments, at any point during the optimization process, only the set of essential scenarios are kept active, thereby substantially reducing runtime and memory requirements without compromising on the quality of results.

26 Claims, 10 Drawing Sheets

HYPER-CONCURRENT OPTIMIZATION OVER MULTI-CORNER MULTI-MODE SCENARIOS

TECHNICAL FIELD

This disclosure relates to electronic design automation (EDA). More specifically, this disclosure relates to methods and apparatuses for performing hyper-concurrent multi-scenario optimization.

BACKGROUND

Related Art

The relentless miniaturization and increasing complexity of integrated circuits have been key driving forces behind the rapid advances in computer technology.

The advance to smaller semiconductor geometries has increased the variability in process and operating conditions of integrated circuits. A process corner is a particular set of process conditions under which the circuit design may be manufactured. An operating corner is a particular set of operating conditions (e.g., temperature, voltage) under which the circuit design may operate. The term "corner" can refer to a process corner, an operating corner, or a combination thereof.

One reason for the increase in complexity of circuit designs is the introduction of a large number of operational modes (e.g., stand-by, mission, test, etc.). Different operational modes can have drastically different voltages, clock speeds, etc. Specifically, some parts of the circuit design may be completely switched off in certain operational modes.

Note that operational modes are different from operating corners. Specifically, operational modes are design dependent, i.e., the circuit design dictates the different operational modes in which a circuit design can operate. For example, typical operational modes for a circuit design include, but are not limited to, a normal mode, a sleep mode, a stand-by mode, and a test mode. On the other hand, an operating corner depends on the temperature and voltage variations that are expected to occur during operation. For example, if a chip is expected to be used over a temperature range of −40° C. to 80° C., then the circuit designer may define multiple operating corners that are associated with different operating temperatures.

An important goal is to ensure that a circuit design meets the functional and performance requirements under all possible operating conditions and process corners. The term "Multi-Corner/Multi-Mode (MCMM) scenario," or "scenario" for short, refers to a combination of a particular corner and a particular operational mode.

Circuit optimization is a very complex task which can consume a significant portion of the circuit design time. Therefore, the task of optimizing a circuit design across multiple scenarios can easily become computationally intensive if the number of scenarios is too large.

Unfortunately, the number of scenarios over which circuit designs are desired to be optimized is increasing rapidly as semiconductor geometries become smaller and circuit designs become more complex.

SUMMARY

Optimizing a circuit design can involve modifying the circuit design so that one or more design constraints are met over a set of scenarios. Each scenario can be associated with a corner and a mode. Some embodiments of the present invention provide techniques and systems for reducing the number of scenarios over which a circuit design is optimized, and in doing so, reducing the amount of computation required to optimize the circuit design. The scenario reduction techniques presented in this disclosure attempt at attaining similar Quality of Results (QoR) across all scenarios, had the circuit design been optimized with all the scenarios.

In some embodiments, the system can receive a set of scenarios over which the circuit design is to be optimized. Next, the system can determine one or more margin values for each gate in a set of gates in each scenario in the set of scenarios. Each margin value can indicate an amount by which a parameter can be changed in a scenario without violating a design rule requirement or affecting a slack value at a timing end-point. For example, a timing margin value at an output pin of a gate can be associated with a timing end-point and a scenario, and the timing margin value can indicate an amount of timing degradation at the output pin of the gate which is unobservable at the associated timing end-point in the associated scenario. In the case of non-timing design requirements (e.g., maximum capacitance, maximum fan-out, etc.), a margin value can indicate a difference between the maximum (or minimum) allowable parameter value and the actual parameter value. For example, the leakage margin for a gate in a scenario can indicate how much the gate's leakage power can be increased in the scenario without violating a leakage power limit. Similarly, a capacitive load margin at a gate's output pin in a scenario can indicate how much the capacitive load on the gate's output pin can be increased in the scenario without violating a maximum capacitance limit. Once the margin values are determined, the system can use the margin values to reduce the amount of computation required to optimize the circuit design over the set of scenarios.

Specifically, in some embodiments, the system can use the margin values associated with a gate to determine a subset of scenarios for the gate in which one or more margin values are critical or near-critical. Note that the term "subset" refers to all or a portion of a set. This subset of scenarios is called the set of essential scenarios for the gate. Specifically, a set of scenarios for a gate whose worst timing, DRCs (design rule checks), and leakage are affected by a change at that gate, is referred to as the set of essential scenarios for that gate. In general, the cardinality of the set of essential scenarios for a gate increases as more near-critical (margin) values are considered. In other words, if we consider values that are within some margin threshold from those of the worst scenario, then the cardinality of the set of essential scenarios for the gate is expected to be larger than if only the worse values were considered.

In some embodiments, the system can compare a margin value with an associated threshold to determine whether the margin value is critical or near-critical. Next, the system can optimize the circuit design, wherein if a gate is modified during optimization, circuit information is updated in at least the set of essential scenarios associated with the gate. The amount of computation required for optimization is reduced because the cardinality of the set of essential scenarios can be much smaller than the cardinality of the set of scenarios.

In some embodiments, the system can group gates into buckets. Each bucket is associated with a set of essential scenarios, and each bucket includes gates whose sets of essential scenarios are a subset of the set of essential scenarios associated with the bucket. The system can then optimize the circuit design on a bucket-by-bucket basis, e.g., the system can first optimize gates in bucket B1, then optimize gates in bucket B2, and so forth.

Note that, when the system optimizes gates in a bucket, the system updates circuit information in the set of essential scenarios for that bucket. Hence, before starting to optimize gates in the next bucket, the system needs to ensure that the circuit information in the set of essential scenarios associated with the next bucket is up-to-date. For example, after optimizing the gates in bucket B1, the system can update the circuit information for scenarios that will be considered while optimizing bucket B2, but which were not considered while optimizing bucket B1. Circuit information can generally include any information that needs to be updated in the circuit design when a gate in the circuit design is changed. For example, circuit information can include the power leakage of a gate, the capacitive load at a pin, and the timing information (e.g., arrival times, required times, and slack values) at a pin.

In some embodiments, the system can determine a set of essential scenarios for gates and timing end-points. Specifically, the system can use margin values for each gate in a set of gates in each scenario in the set of scenarios to determine a set of essential scenarios for each gate in the set of gates. Next, the system can use a slack value at each timing end-point in a set of timing end-points in each scenario in the set of scenarios to determine a set of essential scenarios for each timing end-point in the set of timing end-points. Note that each timing end-point can have a different slack value in each scenario. The system can determine a set of essential scenarios for a timing end-point by determining scenarios in which the slack values are critical or near critical. In some embodiments, the system can perform multiple iterations of optimizations, wherein only critical slack values are used in the initial iterations, and both critical and near critical slack values are used in later iterations.

Next, the system can group timing end-points into buckets, wherein each bucket is associated with a set of essential scenarios, and wherein each bucket includes timing end-points whose sets of essential scenarios are a subset of the set of essential scenarios associated with the bucket. The system can then perform constrained optimization on each bucket by transforming gates whose sets of essential scenarios are subsets of the set of essential scenarios associated with the bucket. For example, the system can first perform delay optimization for timing end-points in bucket B1, and then perform delay optimization for timing end-points in bucket B2, and so forth. In some embodiments, during the constrained optimization, circuit information is updated only in the set of essential scenarios associated with the bucket. For example, suppose bucket B1's set of essential scenarios is {S1, S2, S3}. Then, the system performs timing optimization on the timing end-points in bucket B1 by processing only those gates in the circuit design whose set of essential scenarios is a subset of {S1, S2, S3}.

In some embodiments, for each timing end-point, the system can receive a set of candidate gates for optimizing timing. For example, the system can use margin values to determine a set of candidate gates for optimizing timing for a timing end-point. The system can then use the margin values to determine a set of essential scenarios for each candidate gate. Next, for each timing end-point, the system can compute a union of the sets of essential scenarios associated with the candidate gates that are going to be used for optimizing timing. Once a set of essential scenarios is determined for each timing end-point, the system can group the timing end-points into buckets, wherein each bucket is associated with a set of essential scenarios, and wherein each bucket includes timing end-points whose sets of essential scenarios are a subset of the set of essential scenarios associated with the bucket. Next, the system can perform constrained optimization on each bucket by transforming gates whose sets of essential scenarios are subsets of the set of essential scenarios associated with the bucket, wherein during the constrained optimization, circuit information is updated in the set of essential scenarios associated with the bucket.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
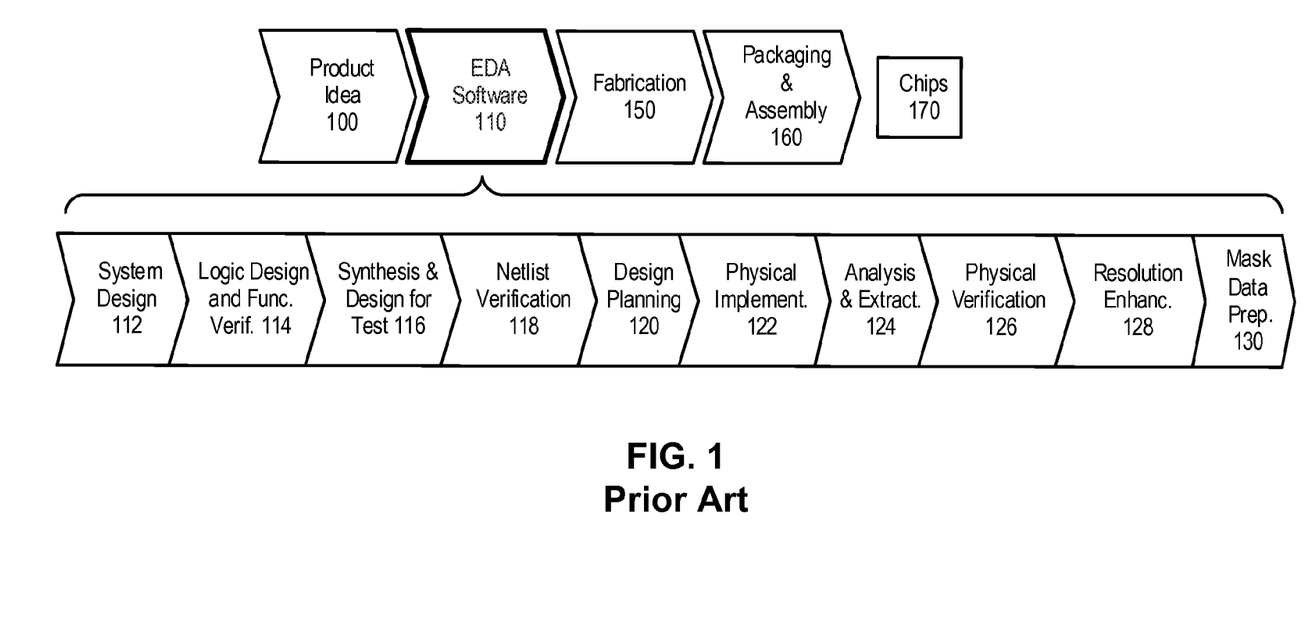
FIG. 1 illustrates various steps in the design and fabrication of an integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to correct any functional, manufacturing, electrical, or lithographic issues.

In the resolution enhancement step 128, geometric manipulations can be performed on the layout to improve manufacturability of the design. Finally, in the mask data preparation step 130, the design can be taped-out for production of masks to produce finished chips.

A circuit optimization technique that optimizes a circuit design over a set of scenarios must meet the functional and performance goals (timing, power, area, etc.) for the circuit design for all the scenarios. Note that, as used in this disclosure, the terms "optimize," "optimizing," "optimization," etc., relate to a process that tries to improve one or more metrics associated with the circuit design. These terms are not intended to imply that a local or a global optimum value is being determined. The metrics could include electrical design rules (e.g., maximum capacitance, maximum transition, maximum fanout), leakage power, area, and timing-related metrics (e.g., Worst Negative Slack (WNS) and Total Negative Slack (TNS)).

Each scenario can be associated with a corner and a mode. For example, a scenario may be associated with a positive defocus process corner and a normal operating mode. If there are no design requirement violations in this scenario, the chip is expected to behave as desired in its normal operating mode, even if the chip was manufactured using a photolithography process that is positively defocused.

Traditional approaches optimize each scenario independently and sequentially. These approaches suffer from poor quality of results and long run-times in converging on an optimal solution for all scenarios. Very often, these techniques fail to converge on an optimal solution because of "ping-pong" effects. For example, if an optimizing transformation performed in one scenario cancels the effects of an optimizing transformation performed in another scenario, the technique may "ping-pong" between these two scenarios, thereby preventing the solution from converging.

Some approaches model all of the scenarios concurrently and construct optimal solutions under the constraints of all scenarios. For example, these approaches evaluate the timing of the circuit by performing static timing analysis for all scenarios, and update timing information for all scenarios when an optimization transformation is applied to a gate. Note that a gate can generally be any portion of the circuit design that performs a logical function and which may have one or more inputs and one or more outputs. In these approaches, the system optimizes the circuit design based on the slack/timing, leakage power, and DRC information over all scenarios. Although these approaches are superior to approaches that optimize one scenario at a time, they incur additional run-time and memory overhead. This is because, in these approaches, whenever timing, power, and DRC information (e.g., electrical design rules) are updated, they have to be updated across all scenarios. Note that the run-time and memory overhead increase with the number of scenarios. Since the number of scenarios is rapidly increasing as semiconductor geometries become smaller and circuit designs become more complex, these approaches are quickly becoming computationally impractical.

Some embodiments of the present invention overcome the run-time and memory overhead of approaches that concurrently analyze and optimize a circuit design over a set of scenarios by identifying a subset of scenarios that is sufficient for achieving optimal implementation results. Once the subset of scenarios has been identified, the analysis and optimization is performed only over the subset of scenarios. Specifically, timing, power, and DRC analyses are performed only on the subset of scenarios. All other scenarios that do not belong to the subset are not considered during analysis and optimization, thereby reducing the run-time and memory requirements.

A circuit design is typically optimized for a number of constraints or optimization criteria (e.g., timing, power, electrical DRC, etc.) in each of the scenarios for each relevant object (e.g., timing end-point, net, cell, design, etc.) in the design. A constrained object in the circuit design can be any object in the circuit design (e.g., a net, a gate, a pin or terminal of a gate, a timing end-point, etc.) which is required to meet one or more design constraints in one or more scenarios.

Some embodiments of the present invention determine margin values associated with the constrained objects in the circuit design in each scenario, and use the margin values to determine the subset of scenarios over which the circuit design needs to be optimized. A margin value indicates an amount by which a parameter can be changed in a scenario without violating a design requirement or affecting a slack value at a timing end-point. Some examples of constraints and the objects that they apply to are discussed in the following paragraphs. The following examples are for illustration purposes only and are not intended to limit the scope of the present invention.

An "electrical design rule" constraint imposes one or more limits on one or more electrical properties or parameters of an object. Examples of electrical design rule (DRC) constraints include: the maximum allowable signal transition time, the maximum allowable capacitive load on each gate, the maximum allowable fan-out of a net, and the maximum length of a net. Different DRC constraints can apply to different types of objects. For example, the maximum allowable signal transition time constraint and the maximum allowable capacitive load constraint can apply to a gate. The maximum allowable fan-out and the maximum length constraints can apply to a net. The margin value for a DRC constraint is the maximum of two values: zero and the difference between the maximum allowable DRC value (as specified by the DRC constraint) and the actual value in the circuit design. In other words, if the difference between the maximum allowable DRC value and the actual value is positive, then this difference is the margin value. On the other hand, if the difference between the maximum allowable DRC value and the actual value is negative, then the margin value is zero. A margin value of zero indicates that any increase in the electrical parameter value at the output pin of the gate will (possibly further) violate the associated maximum limit.

A "power" constraint can impose one or more limits on one or more power-related properties of a circuit design. Examples of power constraints include upper limits on the allowable leakage, dynamic, and/or total power of an object. This constraint can be applied to different levels of objects in the circuit design. For example, the power constraint can be applied to the entire circuit design or to each leaf-level cell instance in the circuit design. Like DRC constraints, the margin value for a power constraint is the maximum of two values: zero and the difference between the maximum allowable value (as specified by the power constraint) and the actual value in the circuit design. In other words, if the difference between the maximum allowable value and the actual value is positive, then this difference is the margin value. On the other hand, if the difference between the maximum allowable DRC value and the actual value is negative, then the margin value is zero. A margin value of zero indicates that any increase in the power consumption of the constrained object will (possibly further) violate the associated maximum power budget.

Figure 2:
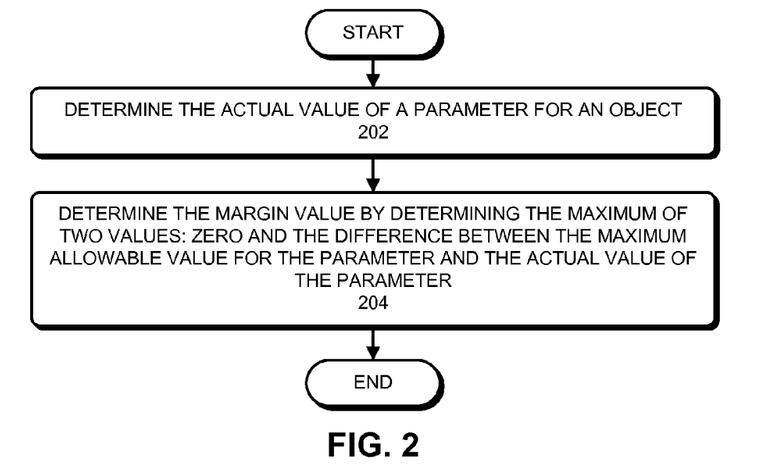
FIG. 2 presents a flowchart that illustrates a process for determining margin values for non-timing constraints in accordance with some embodiments of the present invention.

FIG. 2 presents a flowchart that illustrates a process for determining margin values for non-timing constraints in accordance with some embodiments of the present invention.

The process can begin by determining the actual value of a parameter for an object (step 202). Next, the system can determine the margin value by determining the maximum of two values: zero and the difference between the maximum allowable value for the parameter and the actual value of the parameter (step 204). For example, suppose the power consumption values of a gate in scenarios S1 and S2 are 25 and 32 units, respectively. Further, assume that the maximum power limit is 30 units. Then, the power margin values for the gate in scenarios S1 and S2 will be 5 and 0 units, respectively.

The following paragraphs first provide examples of timing constraints, then explain how timing information can be updated in the circuit design, and then explain how margin values can be determined for timing constraints.

A "maximum delay timing" constraint (also known as a "setup time" constraint) requires a signal to arrive at a timing end-point before the required time associated with the timing end-point. If this constraint is violated, the circuit design will most likely need to be operated at a slower speed. The value of this constraint can be represented in terms of slack (which is the difference between the required time and the arrival time of a signal). The magnitude of this value can be negative (when the end-point does not meet the constraint) or positive (when the end-point satisfies the constraint). Note that a timing end-point can have multiple required times. In such cases, the system can either keep track of each slack separately (e.g., by creating a separate object for each required time), or the system can keep track of the worst-case slack across all required times associated with a timing end-point.

A "minimum delay timing" constraint (also known as a "hold time" constraint) requires a signal to arrive at a timing end-point after the required time. If this constraint is violated, the circuit will most likely be inoperable and/or have incorrect functionality (e.g., because the signal was not captured by a register). The value of this constraint can be represented in terms of slack (which is the difference between the arrival time and the required time of a signal). The magnitude of this value can be negative (when the end-point does not meet the constraint) or positive (when the end-point satisfies the constraint).

Figure 3:
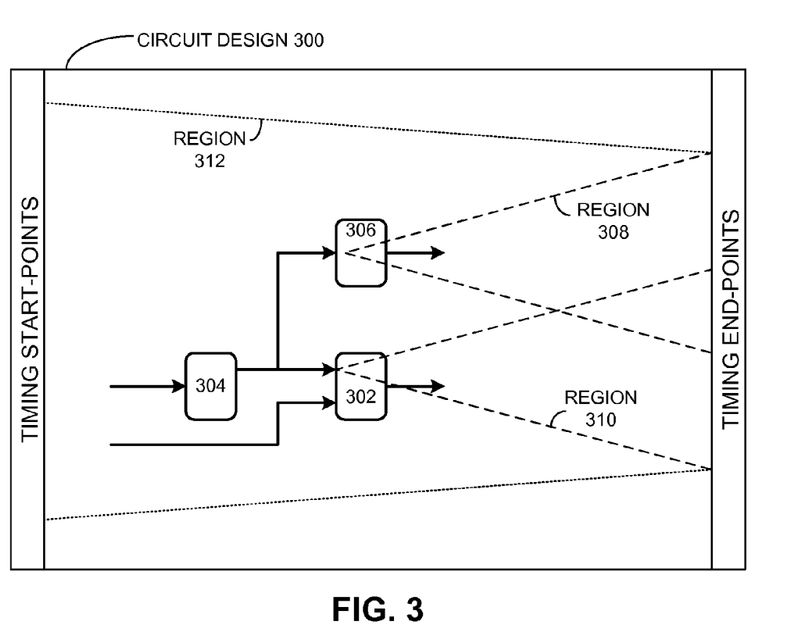
FIG. 3 illustrates how timing information can be propagated in a circuit design.

FIG. 3 illustrates how timing information can be propagated in a circuit design.

Circuit design 300 can be part of a larger circuit design. A timing start-point or end-point can generally be any point in a circuit design where one or more timing requirements need to be satisfied. Specifically, a timing start-point can be a register output or a primary input, and a timing end-point can be a register input or a primary output.

Circuit design 300 includes gates 302, 304, and 306. Applying an optimization transformation to gate 302 can change the capacitive load on gate 304, which can change the arrival and transition times at gate 304's output, gate 302's input, and gate 306's input. These changes can ripple through regions 308 and 310 to the timing end-points of circuit design 300. This, in turn, can cause the required times in the entire fan-in cones of these timing end-points to be out-of-date. Hence, after propagating the timing information in the forward direction, conventional systems typically propagate required times in the backward direction, e.g., backward along region 312 to the timing start-points. Further details on static timing analysis and propagation of timing information can be found in Luciano Lavagno (Editor), Louis Scheffer (Editor), Grant Martin (Editor), *EDA for IC Implementation, Circuit Design, and Process Technology* (*Electronic Design Automation for Integrated Circuits Handbook*), CRC Press, $1^{st}$ Ed., March 2006.

FIGS. 4A-4D illustrate how margin values can be determined for timing constraints in accordance with some embodiments of the present invention. Circuit design 400 can be part of a larger circuit design. Circuit design 400 includes gates 402, 404, 406, 408, and 410.

Figure 4A:
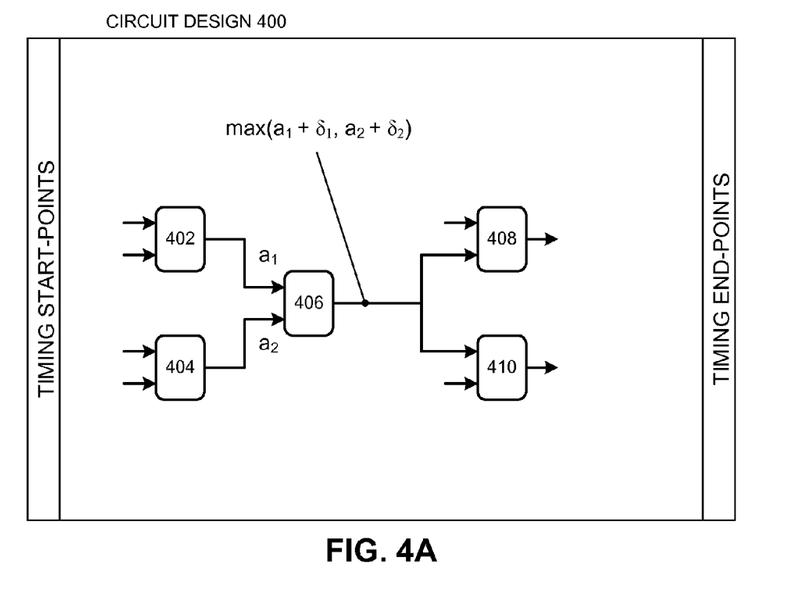
FIGS. 4A-4D illustrate how margin values can be determined for timing constraints in accordance with some embodiments of the present invention.

FIG. 4A illustrates how arrival times can be propagated in accordance with some embodiments of the present invention.

As mentioned before, arrival times at the timing start-points are propagated toward the timing end-points. For example, suppose the arrival times at the inputs of gate 406 are $a_1$ and $a_2$. The arrival times can be propagated to the output pin of gate 406 as follows. First, delays $\delta_1$ and $\delta_2$ can be added to arrival times $a_1$ and $a_2$, respectively. Delays $\delta_1$ and $\delta_2$ represent the delay experienced by a signal as it traverses from the top and bottom inputs, respectively, of gate 406 to the output pin of gate 406. Next, the arrival times can be merged by selecting the worst-case arrival time. When timing analysis is performed to identify setup violations, the worst-case arrival time is the maximum arrival time. On the other hand, when timing analysis is performed to identify hold violations, the worst-case arrival time is the minimum arrival time. In the timing propagation example illustrated in FIGS. 4A-4D, timing analysis is being performed to identify setup violations. Hence, as shown in FIG. 4A, the worst-case arrival time at the output pin of gate 406 is equal to the maximum of $(a_1+\delta_1)$ and $(a_2+\delta_2)$. The arrival times can be propagated to the timing end-points in this manner.

Figure 4B:
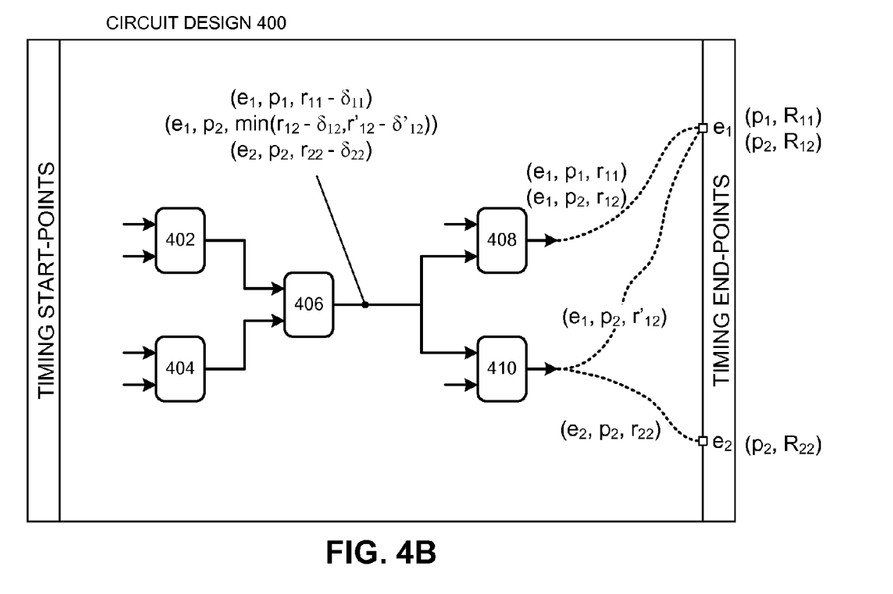

FIG. 4B illustrates how required times can be propagated in accordance with some embodiments of the present invention. Each required time can be associated with a timing end-point in a path-group. A timing end-point can have different required times for different path-groups. For example, required times $R_{11}$ and $R_{12}$ at end-point $e_1$ are associated with path-groups $p_1$ and $p_2$, respectively.

Suppose required times $R_{11}$ and $R_{12}$ are propagated from end-point $e_1$ along the dotted line to the output pin of gate 408. Note that it is possible for required times $R_{11}$ and $R_{12}$ to be propagated back along different paths, but they have been shown to be propagated along the same path in FIG. 4B for the sake of clarity. Let $r_{11}$ and $r_{12}$ denote the required times at the output pin of gate 408. The 3-tuple $(e_1, p_1, r_{11})$ indicates that $r_{11}$ is associated with end-point $e_1$ in path-group $p_1$, and the 3-tuple $(e_1, p_2, r_{12})$ indicates that required time $r_{12}$ is associated with end-point $e_1$ in path-group $p_2$.

Similarly, suppose required times $R_{12}$ and $R_{22}$ are propagated back from end-points $e_1$ and $e_2$, respectively, along the dotted lines to the output pin of gate 410. Let $r'_{12}$ and $r_{22}$ denote the required times at the output pin of gate 410. Note that required time $r'_{12}$ can be different from required time $r_{12}$ because they are propagated along different paths. The 3-tuple $(e_1, p_2, r'_{12})$ indicates that $r'_{12}$ is associated with end-point $e_1$ in path-group $p_2$, and the 3-tuple $(e_2, p_2, r_{22})$ indicates that required time $r_{22}$ is associated with end-point $e_2$ in path-group $p_2$.

The required times at the outputs of gates 408 and 410 can be propagated to the inputs as follows. First, delays $\delta_{11}$, $\delta_{12}$, $\delta'_{12}$, and $\delta_{22}$ can be subtracted from required times $r_{11}$, $r_{12}$, $r'_{12}$, and $r_{22}$, respectively. Delays $\delta_{11}$ and $\delta_{12}$ can represent the delay experienced by a signal as it traverses from a corresponding input of gate 408 to the output pin of gate 408. Delays $\delta'_{12}$ and $\delta_{22}$ can represent the delay experienced by a signal as it traverses from a corresponding input of gate 410 to the output pin of gate 410.

Next, the required times can be merged by selecting the worst-case required time associated with a particular end-point in a particular path-group. When timing analysis is performed to identify setup violations, the worst-case required time is the minimum required time. When timing analysis is performed to identify hold violations, the worst-case required time is the maximum required time. The timing analysis in FIGS. 4A-4D is for identifying setup violations. Hence, as shown in FIG. 4B, the worst-case required times at the output pin of gate 406 are as follows: $(e_1, p_1, r_{11}-\delta_{11})$, $(e_1, p_2, \min(r_{12}-\delta_{12}, r'_{12}-\delta'_{12}))$, and $(e_2, p_2, r_{22}-\delta_{22})$.

Note that the required time associated with end-point $e_1$ in path-group $p_1$ is propagated across gate 408 without any merging, because that is the only required time value associated with end-point $e_1$ in path-group $p_1$. The same is true with the required time associated with end-point $e_2$ in path-group $p_2$, i.e., the required time associated with end-point $e_2$ in path-group $p_2$ is propagated across gate 410 without any merging. However, there are two required time values associated with end-point $e_1$ in path-group $p_2$. Hence, these two required time values are merged and the minimum of the two required time values is propagated. Required times can be propagated to the timing start-points in this manner.

Figure 4C:
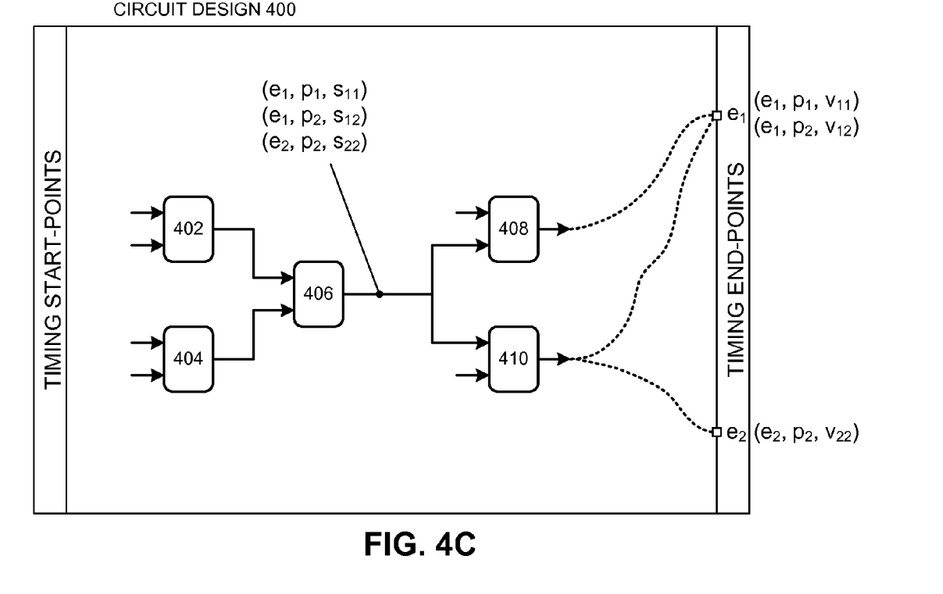

Once the arrival times and the required times have been computed, the system can then compute the slacks and the margins. FIG. 4C illustrates slack values in accordance with some embodiments of the present invention.

Just like required times, each slack value is associated with a timing end-point in a path-group. Specifically, to compute the slack values associated with a pin, the system can subtract the arrival time from the required times. For example, the output pin of gate 406 can have three slack values $s_{11}$, $s_{12}$, and $s_{22}$. The 3-tuples $(e_1, p_1, s_{11})$, $(e_1, p_2, s_{12})$, and $(e_2, p_2, s_{22})$ represent the association between the slack values and the timing end-points in the path-groups. The three slack values can be computed as follows: $s_{11}=(r_{11}-\delta_{11})-\max((a_1+\delta_1), (a_2+\delta_2))$; $s_{12}=\min(r_{12}-\delta_{12}, r'_{12}-\delta'_{12})-\max((a_1+\delta_1),(a_2+\delta_2))$; and $s_{22}=(r_{22}-\delta_{22})-\max((a_1+\delta_1), (a_2+\delta_2))$. Recall that $a_1$ and $a_2$ are the arrival times at the inputs of gate 406, and delays $\delta_1$ and $\delta_2$ represent the delay experienced by a signal as it traverses from the top and bottom inputs, respectively, of gate 406 to the output pin of gate 406.

Slack values can similarly be computed at the timing end-points. These slack values are shown in FIG. 4C as $v_{11}$, $v_{12}$, and $v_{22}$. Note that each timing end-point can have different slack values for different path-groups. The 3-tuples $(e_1, p_1, v_{11})$, $(e_1, p_2, v_{12})$, and $(e_2, p_2, v_{22})$ represent the association between the slack values and the timing end-points in the path-groups.

Figure 4D:
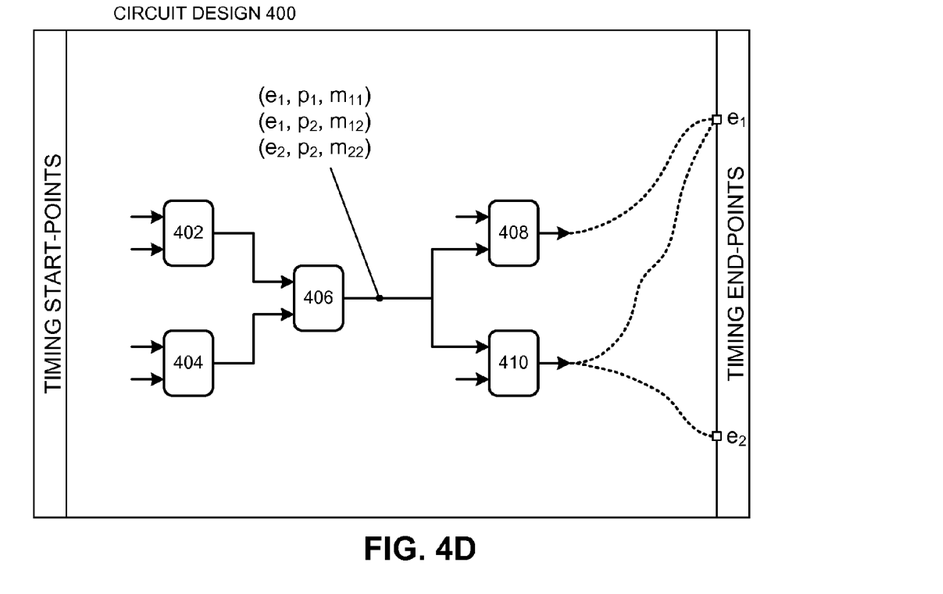

Next, the margin value at an output can be computed by subtracting the slack value at the timing end-point from the slack value at the output. FIG. 4D illustrates margin values for timing constraints in accordance with some embodiments of the present invention.

Just like required times and slack values, each margin value is associated with a timing end-point in a path-group. The margin values at the output pin of gate 406 are shown in FIG. 4D as $m_{11}$, $m_{12}$, and $m_{22}$. The 3-tuples $(e_1, p_1, m_{11})$, $(e_1, p_2, m_{12})$, and $(e_2, p_2, m_{22})$ represent the association between the margin values and the timing end-points in the path-groups. The three margin values can be computed as follows: $m_{11}=s_{11}-v_{11}$; $m_{12}=s_{12}-v_{12}$; and $m_{22}=s_{22}-v_{22}$. A margin value of zero indicates that any change in the slack value at the output pin of the gate will affect the slack value at the associated end-point in the path-group. A positive margin value indicates the amount of timing degradation at the output pin of the gate which is not observable (i.e., which will not affect the slack value) at the associated end-point in the path-group. In some embodiments, the minimum margin value at an output pin can be determined by determining the minimum margin value at the output pin across all timing end-points in all path-groups. This minimum margin value represents the tightest constraint on the output pin.

Figure 5:
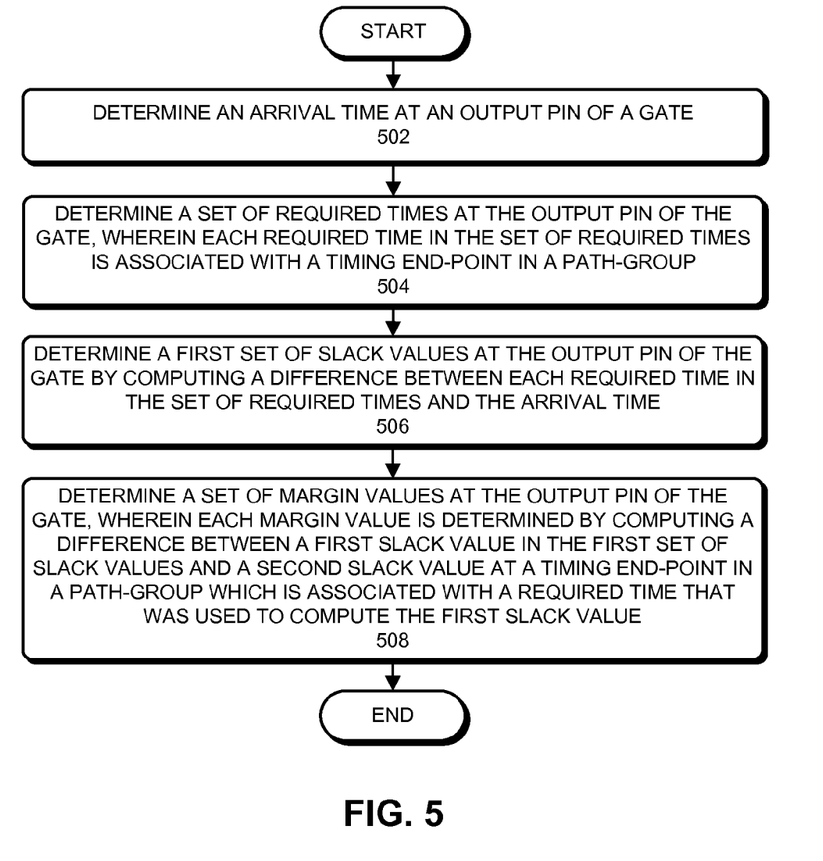
FIG. 5 presents a flowchart that illustrates a process for determining margin values for timing constraints in accordance with some embodiments of the present invention.

FIG. 5 presents a flowchart that illustrates a process for determining margin values for timing constraints in accordance with some embodiments of the present invention.

The process can begin by determining an arrival time at an output pin of a gate (step 502). As explained above, determining the arrival time at an output pin of a gate can involve determining a maximum arrival time in a set of arrival times which is propagated forward from a set of input pins of the gate to the output pin of the gate. If timing analysis is performed to identify hold violations, the system can determine the minimum arrival time instead of the maximum arrival time.

Next, the system can determine a set of required times at the output pin of the gate, wherein each required time in the set of required times is associated with a timing end-point in a path-group (step 504). As explained above, determining a required time associated with a timing end-point in a path-group at the output pin of the gate includes determining a minimum required time in a set of fan-out required times associated with the timing end-point in the path-group, wherein the set of fan-out required times is propagated backward from a set of fan-out gates electrically coupled to the output pin of the gate. If timing analysis is performed to identify hold violations, the system can determine the maximum required time instead of the minimum required time.

The system can then determine a first set of slack values at the output pin of the gate by computing a difference between each required time in the set of required times and the arrival time (step 506).

Next, the system can determine a set of margin values at the output pin of the gate, wherein each margin value is determined by computing a difference between a first slack value in the first set of slack values and a second slack value at a timing end-point in a path-group which is associated with a required time that was used to compute the first slack value (step 508).

In this manner, the system can keep track of required times, slack values, and margin values for each timing end-point in each path-group, and compute multiple margin values at the output pins of gates that are candidates for optimization.

Further details on determining and using margin values for timing constraints can be found in U.S. patent application Ser. No. 12/783,915, by inventors Mahesh A. Iyer, Amir H. Mottaez, and Rajnish K. Prasad, entitled "Global Timing Modeling Within a Local Context," filed on 20 May 2010, which is incorporated herein by reference.

Once the margin values have been determined for all constrained objects across all scenarios, the system can then use this information to identify a subset of scenarios such that, if the circuit design is optimized for the subset of scenarios, the circuit design is expected to be optimized for all scenarios. Specifically, if the circuit design is optimized so that the value of a constrained object in the worst-case scenario meets the constraint, then it is very likely that all other scenarios will also meet the constraint.

Figure 6:
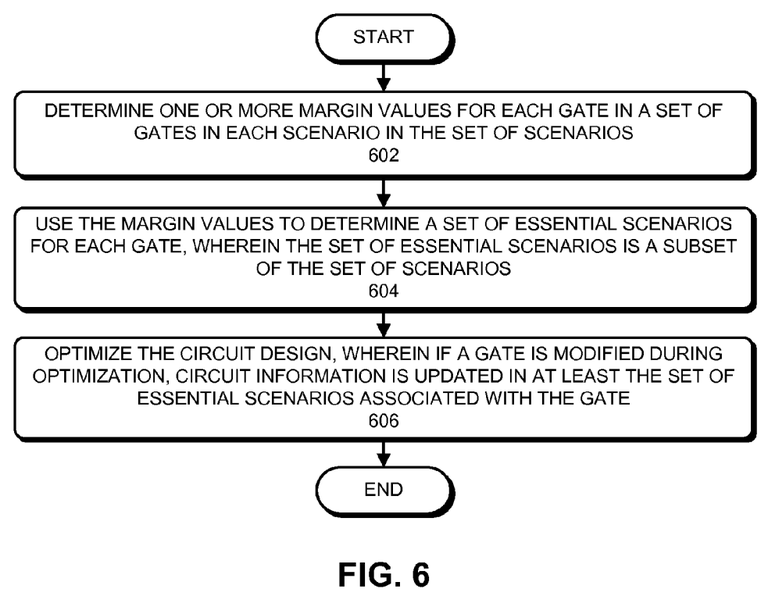
FIG. 6 presents a flowchart that illustrates a process for optimizing a circuit design over a set of scenarios in accordance with some embodiments of the present invention.

FIG. 6 presents a flowchart that illustrates a process for optimizing a circuit design over a set of scenarios in accordance with some embodiments of the present invention.

The process can begin by determining one or more margin values for each gate in a set of gates in each scenario in the set of scenarios (step 602). As explained above, a margin value indicates an amount by which a parameter can be changed in a scenario without violating a design requirement or affecting a slack value at a timing end-point.

Next, the system can use the margin values to determine a set of essential scenarios for each gate in the set of gates (step 604). Note that each set of essential scenarios is a subset of the set of scenarios. Each set of essential scenarios can include scenarios in which one or more margin values are either critical (e.g., equal to zero), or near critical (e.g., less than a threshold). In other words, the system can determine a set of essential scenarios for a gate by determining scenarios in which at least one margin value associated with a constraint is less than a threshold associated with the constraint.

For example, suppose a gate needs to be optimized for constraints C1 and C2 over a set of four scenarios: S1, S2, S3, and S4. Further, suppose that the margin values for constraint C1 over scenarios S1, S2, S3, and S4 are 0.0, 0.8, 5.7, and 1.2, respectively; and the margin values for constraint C2 over scenarios S1, S2, S3, and S4 are 5.0, 0.0, 0.9, and 0.2, respectively. Additionally, suppose that the thresholds associated with constraints C1 and C2 are 1.0 and 0.5, respectively. In this example, the set of essential scenarios is {S1, S2, S4}. Scenario S3 is not an essential scenario because both of the margin values in scenario S3 are greater than the associated thresholds.

The system can then optimize the circuit design, wherein if a gate is modified during optimization, circuit information is updated in at least the set of essential scenarios associated with the gate (step 606). Specifically, in some embodiments, circuit information is updated only in the set of essential scenarios associated with the gate.

Process for Optimizing Area, Leakage Power, and DRCs

Figure 7:
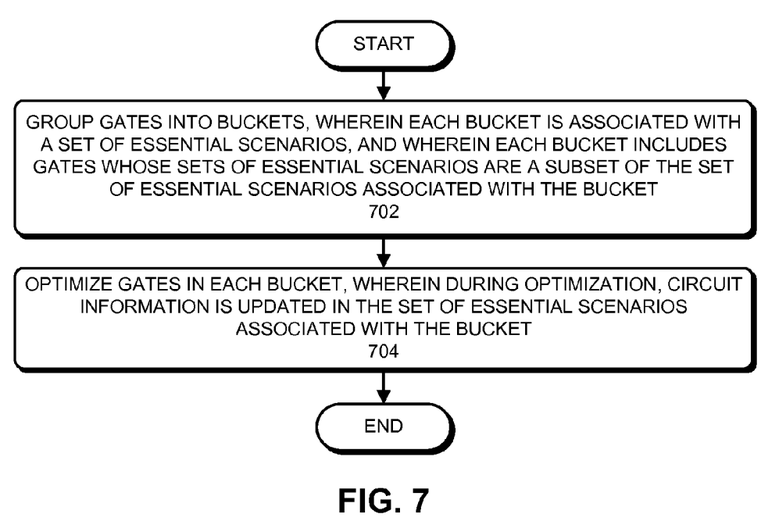
FIG. 7 presents a flowchart that illustrates a process for optimizing a circuit design over a set of scenarios in accordance with some embodiments of the present invention.

FIG. 7 presents a flowchart that illustrates a process for optimizing a circuit design over a set of scenarios in accordance with some embodiments of the present invention. The process illustrated in FIG. 7 can be performed during step 606 to optimize non-timing metrics such as area, leakage power, and DRCs.

The process can begin by grouping gates into buckets, wherein each bucket is associated with a set of essential scenarios, and wherein each bucket includes gates whose sets of essential scenarios are a subset of the set of essential scenarios associated with the bucket (step 702). In some embodiments, margin values can be used to determine a set of essential scenarios for each gate. However, embodiments of the present invention are not limited to using margin values to determine the set of essential scenarios.

Next, the system can optimize the circuit design by optimizing gates in each bucket, wherein during optimization, circuit information is updated in the set of essential scenarios associated with the bucket (step 704).

For example, suppose gates G1, G2, and G3 are associated with essential scenario sets {S1, S2}, {S1, S2}, and {S1, S2, S3}, respectively. In one embodiment, the system may create two buckets corresponding to the two sets of essential scenarios, e.g., buckets B1 and B2 which correspond to essential scenario sets {S1, S2} and {S1, S2, S3}, respectively. In this embodiment, gates G1 and G2 are put in bucket B1 and gate G3 is put in bucket B2. The system can first optimize gates in bucket B1 and then optimize gates in bucket B2. While optimizing gates in bucket B1, the system may update circuit information only in scenarios S1 and S2; the system may not update circuit information in scenario S3 because scenario S3 is not an essential scenario for the gates in bucket B1. However, before optimizing gates in bucket B2, the system needs to update the circuit information in scenario S3. Once the circuit information is updated for scenario S3, the system can then optimize gates in bucket B2. Note that, while optimizing gates in bucket B2, the system updates circuit information in scenarios S1, S2, and S3. In another embodiment, the system may create a single bucket associated with the essential scenario set {S1, S2, S3} and group gates G1, G2, and G3 into this bucket. In this embodiment, the system updates circuit information in scenarios S1, S2, and S3 during optimization.

Process for Optimizing Timing Metrics

Figure 8:
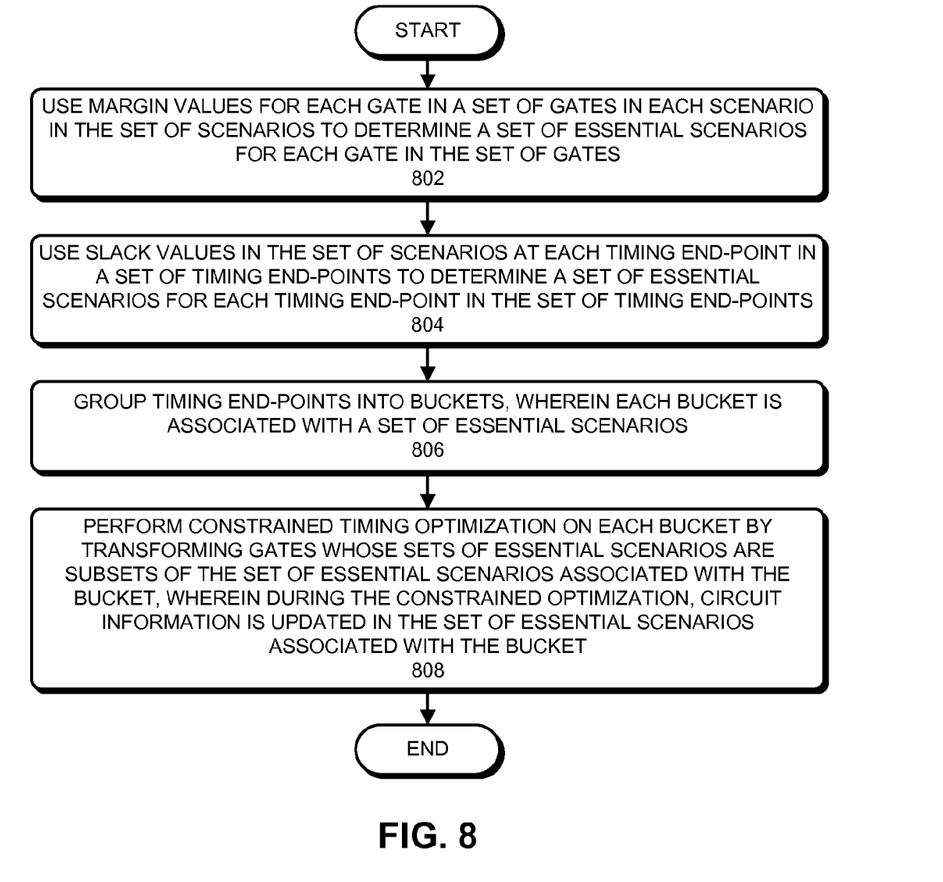
FIG. 8 presents a flowchart that illustrates a process for optimizing a circuit design over a set of scenarios in accordance with some embodiments of the present invention.
Figure 9A:
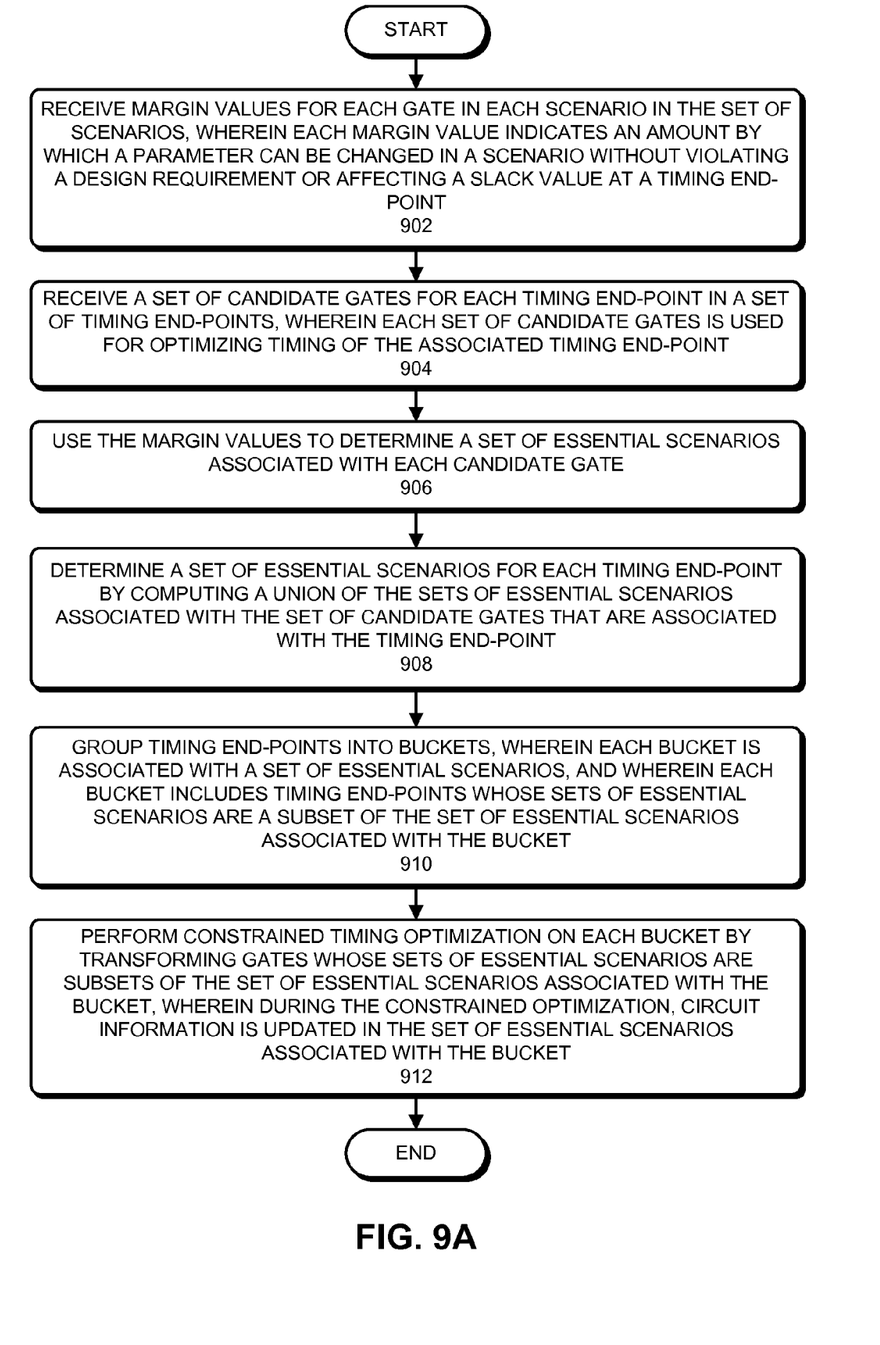
FIG. 9A presents a flowchart that illustrates a process for optimizing a circuit design over a set of scenarios in accordance with some embodiments of the present invention.

FIGS. 8 and 9 describe two approaches for optimizing timing metrics. The approach in FIG. 8 is more aggressive than the approach in FIG. 9 in terms of reducing the number of scenarios. If multiple iterations of optimization are performed on the circuit design, the aggressive approach illustrated in FIG. 8 can be used during the initial iterations, and the conservative approach illustrated in FIG. 9 can be used during the later iterations.

FIG. 8 presents a flowchart that illustrates a process for optimizing a circuit design over a set of scenarios in accordance with some embodiments of the present invention. The process illustrated in FIG. 8 can be performed during step 606 to optimize timing metrics such as WNS and TNS.

The process can begin by determining a set of essential scenarios for each gate in a set of gates (step 802). As described previously, essential scenarios for a gate are those scenarios in which a change in the gate is likely to affect the slack values at one or more timing end-points in the circuit design, violate a leakage power budget, and/or violate a DRC. In some embodiments, margin values can be used to determine a set of essential scenarios. However, embodiments of the present invention are not limited to using margin values to determine the set of essential scenarios.

Next, the system can use slack values in the set of scenarios at each timing end-point in a set of timing end-points to determine a set of essential scenarios for each timing end-point in the set of timing end-points (step 804). As explained above, each timing end-point can have different slack values in different scenarios. A positive slack value at a timing end-point can indicate that the timing requirement is being met, whereas a negative slack value can indicate that the timing requirement is not being met. Instead of only trying to optimize negative slacks, the system may also try to optimize slacks that are barely meeting timing. For example, a user may decide to perform timing optimization for slack values that are less than a threshold, e.g., 0.2.

Next, the system can group timing end-points into buckets, wherein each bucket is associated with a set of essential scenarios (step 806). Each bucket includes timing end-points whose sets of essential scenarios are a subset of the set of essential scenarios associated with the bucket.

The system can then perform constrained timing optimization on each bucket by transforming gates whose sets of essential scenarios are subsets of the set of essential scenarios associated with the bucket, wherein during the constrained optimization, circuit information is updated in the set of essential scenarios associated with the bucket (step 808). In some embodiments, the circuit information is updated only in the set of essential scenarios associated with the bucket. For example, suppose gates G1, G2, and G3 are associated with essential scenario sets {S1, S2}, {S1, S2, S4}, and {S1, S2, S3}, respectively. Further, suppose that bucket B1 includes one or more timing end-points and is associated with essential scenario set {S1, S2, S4}. Then, to perform constrained optimization for the timing end-points in bucket B1, the system may optimize gates G1 and G2, but not gate G3. In some embodiments, during optimization, circuit information is updated only in scenarios S1, S2, and S4.

FIG. 9A presents a flowchart that illustrates a process for optimizing a circuit design over a set of scenarios in accordance with some embodiments of the present invention. The process illustrated in FIG. 9A can be performed during step 606 to optimize timing metrics such as WNS and TNS.

The process can begin by receiving margin values for each gate in each scenario in the set of scenarios, wherein each margin value indicates an amount by which a parameter can be changed in a scenario without violating a design requirement or affecting a slack value at a timing end-point (step 902).

Next, the system can receive a set of candidate gates for each timing end-point in a set of timing end-points, wherein each set of candidate gates is used for optimizing timing of the associated timing end-point (step 904). In some embodiments, the system can use the timing margin values to identify candidate gates for each timing end-point. For example, for each timing end-point, the system can identify gates that have a timing margin associated with the timing end-point that is less than a given threshold.

Figure 9B:
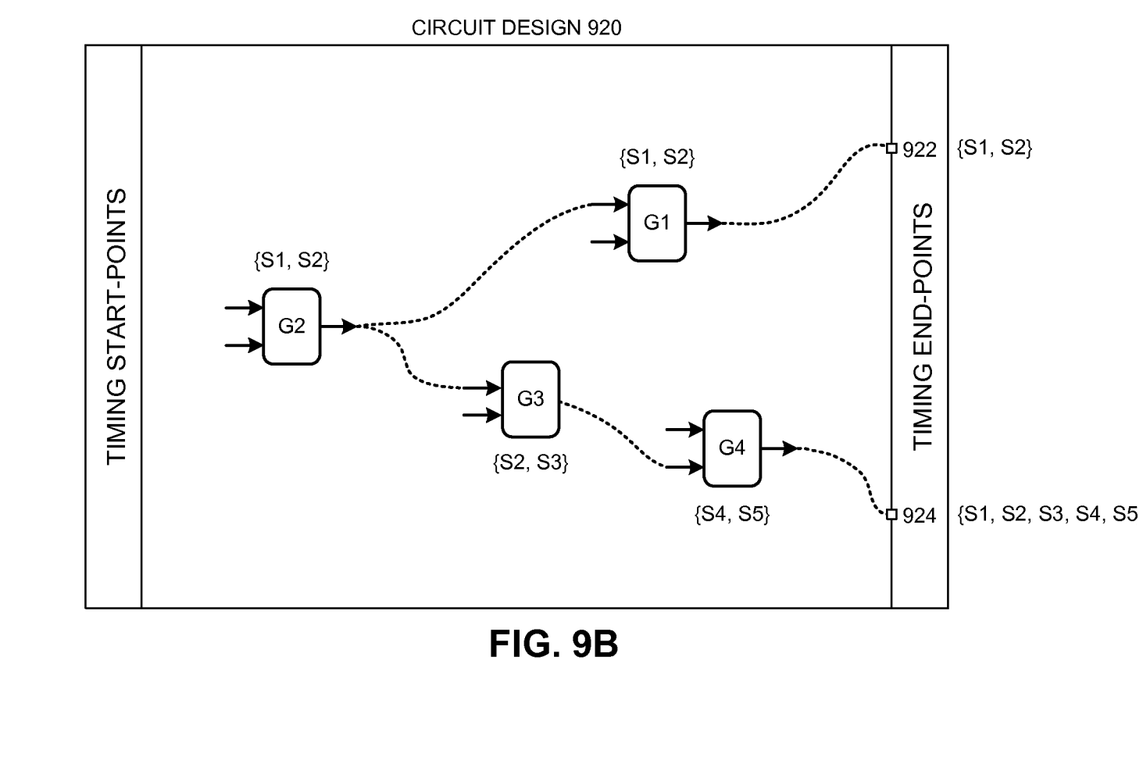
FIG. 9B illustrates candidate gates for timing end-points in accordance with some embodiments of the present invention.

FIG. 9B illustrates candidate gates for timing end-points in accordance with some embodiments of the present invention.

In circuit design 920, the system can identify the set of candidate gates {G1, G2} for optimizing timing at timing end-point 922, and the set of candidate gates {G2, G3, G4} for optimizing timing at timing end-point 924.

The system can then use the margin values to determine a set of essential scenarios associated with each candidate gate (step 906).

Next, the system can determine a set of essential scenarios for each timing end-point by computing a union of the sets of essential scenarios associated with the set of candidate gates that are associated with the timing end-point (step 908). For example, as shown in FIG. 9B, suppose the essential scenario sets for gates G1, G2, G3, and G4 are {S1, S2}, {S1, S2}, {S2, S3}, and {S4, S5}, respectively. Then, the set of essential scenarios for timing end-point 922 is {S1, S2} because that is the union of the essential scenario sets for gates G1 and G2. The set of essential scenarios for timing end-point 924 is {S1, S2, S3, S4, S5} because that is the union of the essential scenario sets for gates G2, G3, and G4.

Then system can then group timing end-points into buckets, wherein each bucket is associated with a set of essential scenarios, and wherein each bucket includes timing end-points whose sets of essential scenarios are a subset of the set of essential scenarios associated with the bucket (step 910). For example, the system may create two buckets—bucket B1 for essential scenario set {S1, S2} and bucket B2 for essential scenario set {S1, S2, S3, S4, S5}. In this case, bucket B1 will include timing end-point 922, and bucket B2 will include timing end-point 924. Alternatively, the system may create a single bucket, say B1, for essential scenario set {S1, S2, S3, S4, S5}, which includes timing end-points 922 and 924.

Next, the system can perform constrained timing optimization on each bucket by transforming gates whose sets of essential scenarios are subsets of the set of essential scenarios associated with the bucket, wherein during the constrained optimization, circuit information is updated in the set of essential scenarios associated with the bucket (step 912). In some embodiments, the circuit information is updated only in the set of essential scenarios associated with the bucket.

Figure 10:
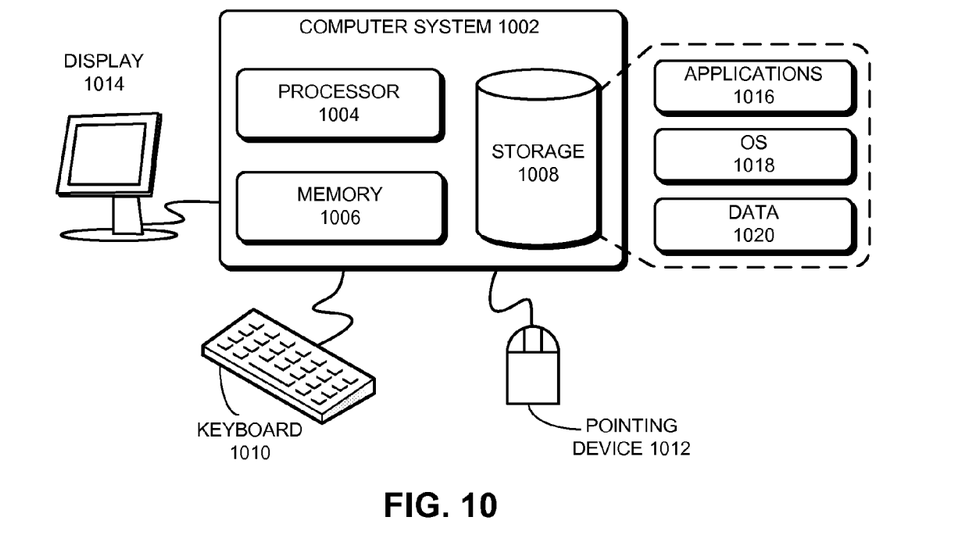
FIG. 10 illustrates a computer system in accordance with some embodiments of the present invention.

FIG. 10 illustrates a computer system in accordance with some embodiments of the present invention.

Computer system 1002 can include a processor 1004, a memory 1006, and a storage device 1008. Computer system 1002 can be coupled to a display device 1014, a keyboard 1010, and a pointing device 1012. Storage device 1008 can store operating system 1018, applications 1016, and data 1020.

Applications 1016 can include instructions which, when executed by computer system 1002, can cause computer system 1002 to perform processes which are implicitly or explicitly described in this disclosure. Data 1020 can include any data that is required as input or that is generated as output by processes which are inherently or explicitly described in this disclosure.

Figure 11:
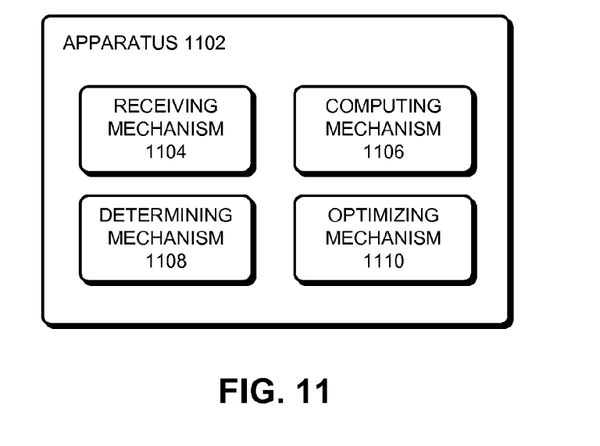
FIG. 11 illustrates an apparatus in accordance with some embodiments of the present invention.

FIG. 11 illustrates an apparatus in accordance with some embodiments of the present invention.

Apparatus 1102 can comprise a plurality of mechanisms which may communicate with one another via a wired or wireless communication channel. Apparatus 1102 may be realized using one or more integrated circuits, and apparatus 1102 may include fewer or more mechanisms than those shown in FIG. 11. Further, apparatus 1102 may be integrated in a computer system, or it may be realized as a separate device which is capable of communicating with other computer systems and/or devices.

Apparatus 1102 can include one or more mechanisms which are configured to perform operations which are inherently or explicitly described in this disclosure. Specifically, apparatus 1102 can include receiving mechanism 1104, computing mechanism 1106, determining mechanism 1108, and optimizing mechanism 1110. Receiving mechanism 1104 can be configured to receive a set of scenarios. Computing mechanism 1106 can be configured to compute margin values. Determining mechanism 1108 can be configured to determine essential scenarios based at least on the margin values. Optimizing mechanism 1110 can be configured to use the essential scenarios to optimize a circuit design.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) tool, a method for optimizing a circuit design over a set of scenarios, the method comprising:
    upon receipt of the circuit design, determining one or more margin values for each gate in a set of gates in each scenario in the set of scenarios, wherein a margin value indicates an amount by which a parameter can be changed in a scenario without violating a design requirement or affecting a slack value at a timing end-point;
    determining a set of essential scenarios for each gate in the set of gates based on the margin values, wherein determining the set of essential scenarios includes determining scenarios in which at least one margin value associated with a parameter is less than a threshold associated with the parameter; and
    using one or more computers to optimize the circuit design, wherein if a gate is modified during optimization, circuit information is updated in at least the set of essential scenarios associated with the gate.

2. The method of claim 1, wherein the margin values include a timing margin for an output pin of a gate in a scenario which indicates an amount of timing degradation at the output pin of the gate in the scenario which is unobservable at a timing end-point in a path-group.

3. The method of claim 1, wherein the margin values include a leakage margin for a gate in a scenario which indicates how much the gate's leakage power can be increased in the scenario without violating a leakage power budget.

4. The method of claim 1, wherein the margin values include a maximum capacitance margin for a gate in a scenario which indicates how much the capacitive load on the gate's output pin can be increased in the scenario without violating a maximum capacitance limit.

5. The method of claim 1, wherein using one or more computers to optimize the circuit design involves:
    grouping gates into buckets, wherein each bucket is associated with a set of essential scenarios, and wherein each bucket includes gates whose sets of essential scenarios are a subset of the set of essential scenarios associated with the bucket; and
    optimizing gates in each bucket, wherein during optimization, circuit information is updated in the set of essential scenarios associated with the bucket.

6. The method of claim 1, wherein the circuit information includes timing slack values at one or more pins in the circuit design.

7. The method of claim 1, wherein the circuit information includes leakage power values for gates in the circuit design.

8. The method of claim 1, wherein the circuit information includes capacitive load values and transition time values at one or more pins in the circuit design.

9. A non-transitory computer-readable storage medium storing instructions that, when executed by a computer, cause the computer to perform a method for optimizing a circuit design over a set of scenarios, the method comprising:
    upon receipt of the circuit design, determining one or more margin values for each gate in a set of gates in each scenario in the set of scenarios, wherein a margin value indicates an amount by which a parameter can be changed in a scenario without violating a design requirement or affecting a slack value at a timing end-point;
    determining a set of essential scenarios for each gate in the set of gates based on the margin values, wherein determining the set of essential scenarios includes determining scenarios in which at least one margin value associated with a parameter is less than a threshold associated with the parameter; and
    using one or more computers to optimize the circuit design, wherein if a gate is modified during optimization, circuit information is updated in at least the set of essential scenarios associated with the gate.

10. The non-transitory computer-readable storage medium of claim 9, wherein the margin values include a timing margin for an output pin of a gate in a scenario which indicates an amount of timing degradation at the output pin of the gate in the scenario which is unobservable at a timing end-point in a path-group.

11. The non-transitory computer-readable storage medium of claim 9, wherein the margin values include a leakage margin for a gate in a scenario which indicates how much the gate's leakage power can be increased in the scenario without violating a leakage power budget.

12. The non-transitory computer-readable storage medium of claim 9, wherein the margin values include a maximum capacitance margin for a gate in a scenario which indicates how much the capacitive load on the gate's output pin can be increased in the scenario without violating a maximum capacitance limit.

13. The non-transitory computer-readable storage medium of claim 9, wherein using one or more computers to optimize the circuit design involves:
    grouping gates into buckets, wherein each bucket is associated with a set of essential scenarios, and wherein each bucket includes gates whose sets of essential scenarios are a subset of the set of essential scenarios associated with the bucket; and optimizing gates in each bucket, wherein during optimization, circuit information is updated in the set of essential scenarios associated with the bucket.

14. The non-transitory computer-readable storage medium of claim 9, wherein the circuit information includes timing slack values at one or more pins in the circuit design.

15. The non-transitory computer-readable storage medium of claim 9, wherein the circuit information includes leakage power values for gates in the circuit design.

16. The non-transitory computer-readable storage medium of claim 9, wherein the circuit information includes capacitive load values and transition time values at one or more pins in the circuit design.

17. A non-transitory computer-readable storage medium storing instructions that, when executed by a computer, cause the computer to perform a method for optimizing a circuit design over a set of scenarios, the method comprising:
upon receipt of the circuit design, determining a set of essential scenarios for each gate in a set of gates;
grouping gates into buckets, wherein each bucket is associated with a set of essential scenarios, and wherein each bucket includes gates whose sets of essential scenarios are a subset of the set of essential scenarios associated with the bucket; and
optimizing gates in each bucket, wherein during optimization, circuit information is updated only in the set of essential scenarios associated with the bucket.

18. A non-transitory computer-readable storage medium storing instructions that, when executed by a computer, cause the computer to perform a method for optimizing a circuit design over a set of scenarios, the method comprising:
upon receipt of the circuit design, determining a set of essential scenarios for each gate in a set of gates;
determining a set of essential scenarios for each timing end-point in a set of timing end-points based on slack values in the set of scenarios at each timing end-point in the set of timing end-points;
grouping timing end-points into buckets, wherein each bucket is associated with a set of essential scenarios, and wherein each bucket includes timing end-points whose sets of essential scenarios are a subset of the set of essential scenarios associated with the bucket; and
performing, by computer, constrained timing optimization on each bucket by modifying gates whose sets of essential scenarios are subsets of the set of essential scenarios associated with the bucket, wherein during the constrained optimization, circuit information is updated only in the set of essential scenarios associated with the bucket.

19. The non-transitory computer-readable storage medium of claim 18, wherein determining the set of essential scenarios for each gate in the set of gates includes:
determining one or more margin values for each gate in the set of gates in each scenario in the set of scenarios, wherein a margin value indicates an amount by which a parameter can be changed in a scenario without violating a design requirement or affecting a slack value at a timing end-point; and
determining the set of essential scenarios for each gate in the set of gates based on the margin values.

20. The non-transitory computer-readable storage medium of claim 18, wherein the circuit information includes timing slack values at one or more pins in the circuit design.

21. The non-transitory computer-readable storage medium of claim 18, wherein the circuit information includes leakage power values for gates in the circuit design.

22. The non-transitory computer-readable storage medium of claim 18, wherein the circuit information includes capacitive load values and transition time values at one or more pins in the circuit design.

23. A non-transitory computer-readable storage medium storing instructions that, when executed by a computer, cause the computer to perform a method for optimizing a circuit design over a set of scenarios, the method comprising:
receiving the circuit design at the computer;
receiving margin values for each gate in each scenario in the set of scenarios, wherein each margin value indicates an amount by which a parameter can be changed in a scenario without violating a design requirement or affecting a slack value at a timing end-point;
receiving a set of candidate gates for each timing end-point in a set of timing end-points, wherein each set of candidate gates is used for optimizing timing of the associated timing end-point;
determining a set of essential scenarios associated with each candidate gate based on the margin values, wherein determining the set of essential scenarios includes determining scenarios in which at least one margin value associated with a parameter is less than a threshold associated with the parameter;
determining a set of essential scenarios for each timing end-point by computing a union of the sets of essential scenarios associated with the set of candidate gates that are associated with the timing end-point;
grouping timing end-points into buckets, wherein each bucket is associated with a set of essential scenarios, and wherein each bucket includes timing end-points whose sets of essential scenarios are a subset of the set of essential scenarios associated with the bucket; and
performing, by computer, constrained timing optimization on each bucket by modifying gates whose sets of essential scenarios are subsets of the set of essential scenarios associated with the bucket, wherein during the constrained optimization, circuit information is updated in the set of essential scenarios associated with the bucket.

24. The non-transitory computer-readable storage medium of claim 23, wherein the circuit information includes timing slack values at one or more pins in the circuit design.

25. The non-transitory computer-readable storage medium of claim 23, wherein the circuit information includes capacitive load values and transition time values at one or more pins in the circuit design.

26. The non-transitory computer-readable storage medium of claim 23, wherein the circuit information includes leakage power values for gates in the circuit design.

* * * * *